United States Patent [19]

Leidy

[11] Patent Number: 5,707,414
[45] Date of Patent: Jan. 13, 1998

[54] SERVO PLUNGER MECHANISM

[75] Inventor: D. Wayne Leidy, Perrysburg, Ohio

[73] Assignee: Owens-Brockway Glass Container Inc., Toledo, Ohio

[21] Appl. No.: 597,765

[22] Filed: Feb. 7, 1996

[51] Int. Cl.$^6$ ............................................. C03B 11/06
[52] U.S. Cl. ................................ 65/158; 65/160; 65/226; 65/305; 65/314; 65/318; 65/322; 65/362
[58] Field of Search ............................. 65/158, 160, 207, 65/223, 226, 229, 246, 305, 314, 318, 320, 322, 362, DIG. 13

[56] References Cited

U.S. PATENT DOCUMENTS

| | | | |
|---|---|---|---|
| 3,180,718 | 4/1965 | Wilhelm | 65/158 |
| 3,607,206 | 9/1971 | Foster et al. | 65/318 |
| 4,033,744 | 7/1977 | Davis | 65/362 |
| 4,048,867 | 9/1977 | Saari . | |
| 4,492,595 | 1/1985 | Nebelung et al. | 65/263 |
| 4,576,057 | 3/1986 | Saari . | |
| 4,585,467 | 4/1986 | Trahan et al. | 65/172 |
| 4,608,075 | 8/1986 | Trahan et al. | 65/362 |
| 4,613,352 | 9/1986 | Krumme et al. | 65/158 |
| 4,623,374 | 11/1986 | Doud et al. | 65/362 |
| 4,636,240 | 1/1987 | Kozora | 65/229 |
| 4,662,923 | 5/1987 | Vajda et al. | 65/160 |
| 4,838,921 | 6/1989 | Trahan | 65/229 |
| 5,037,465 | 8/1991 | Moore | 65/172 |
| 5,139,559 | 8/1992 | Kozora | 65/160 |
| 5,236,485 | 8/1993 | Leweringhaus et al. | 65/29 |
| 5,318,616 | 6/1994 | Keller | 65/362 |
| 5,491,372 | 2/1996 | Erhart . | |

*Primary Examiner*—Steven P. Griffin

[57] ABSTRACT

A plunger mechanism for forming a hollow article of glass in a "narrow neck press and blow" operation which utilizes an electro servo-driven leadscrew to actuate it. A position sensing resolver is used to determine the position of the plunger over the full range of its stroke, and the position information can be used as feedback to control the position of the plunger prior to contacting a molten gob of glass in a mold chamber. The depth of the plunger penetration into the molten gob is then controlled by the pressing pressure, which is a function of motor torque and screw mechanics. It is possible to control the pressure exerted on the molten glass gob by controlling the torque applied by the motor. A separate gob weight controller is not required because changes in gob weight can be determined by closely monitoring the plunger penetration of the gob.

7 Claims, 3 Drawing Sheets

SERVO PLUNGER MECHANISM

BACKGROUND

The present invention relates to a plunger suitable for use in a glass forming machine, for example, of the I.S. type, in forming gobs of molten glass into parisons for subsequent formation into hollow glass articles. The plunger is actuated by an electro servo-driven leadscrew which works in conjunction with a position-sensing resolver to provide plunger position information. Although the instant application primarily addresses the "narrow neck press and blow" ("NNPB") process of glass making, applications as to other types of processes, such as "press and blow," ("P&B") or "blow and blow" ("B&B") will become evident as further described.

I.S. types of glass forming machines are well known in the industry. These machines have a number of individual forming units, or sections, each of which receives gobs of molten glass from a common source and feeds their output to a common conveyor. For the NNPB process, each section has at least one parison forming mold in which gobs of molten glass are formed into parisons and at least one blow mold in which the parisons are blown to the required shape.

In the NNPB process, parisons are formed when a molten gob of glass is delivered to a mold cavity of a press mold and then pressed by a plunger mechanism against the walls of the mold cavity, simultaneously forming the inner surface of the parison (dictated by the shape of the plunger head) and outer surface of the parison (dictated by the shape of the mold cavity). A conventional plunger is usually made up of a cylinder located below the press mold and a piston in the cylinder which is movable towards and away from the mold cavity upon the introduction of fluid under pressure into the cylinder. A piston rod projects from the piston towards the mold cavity and is arranged to carry the plunger so that the movement of the piston causes the movement of the plunger towards and away from the mold cavity.

In a conventional NNPB process, the piston typically uses air pressure to move the plunger into the mold cavity so that a plunger head affixed to the plunger presses the gob of molten glass into the shape of the mold cavity. After the pressing of the gob is complete, the same air under pressure is then used to move the plunger fully out of the mold cavity to the "plunger down" position so the parison can be moved to the next station. After the parison is moved to the next station to be blown into the hollow glass article, the plunger is moved to an intermediate "load" position while the next gob of glass is delivered to the mold cavity, and the process is repeated.

The disadvantages of such a system revolve around factors such as precise control of the actuating air pressure, properties of the liquid glass (which are constantly changing), and the quality of parisons produced due to the individual characteristics of each plunger. For example, the glass pressing pressure in a conventional pneumatic system is typically controlled by a pressure regulator. One pound of change in controlling air pressure results in a twelve pound change in pressing pressure. Consequently, any error in control air pressure is also amplified by a factor of twelve.

Furthermore, variables related to the movement of the plunger, such as the static pressure on the gob of glass and the speed of the plunger, typically depend upon the time axis. That is, in a conventional process, the plunger maintains a certain position for a calculated length of time and then moves to the next position, regardless of system dynamics. This requires precise synchronization of gob delivery, plunger movement, and parison transport, which is difficult at best, and provides no feedback for system correction during operation.

Previous inventions, such as that disclosed by U.S. Pat. No. 5,236,485, attempt to eliminate such problems by utilizing the position of the plunger in lieu of the pneumatically controlled movement of the plunger dependent upon the time variable. In that patent, Leweringhaus teaches a plunger actuated by an "electro-hydraulic power drive." A piston and cylinder arrangement is used as the plunger movement is controlled by hydraulic fluid. A valve is controlled electrically to increase or decrease prescribed amounts of hydraulic fluid from both ends of the piston, allowing for all intermediate positions for the advancing and retracting of the plunger to be available. The actual position of the plunger relative to the cylinder is monitored and compared to predetermined stored values, i.e., the desired positions, thus allowing the feedback to dictate the function of the hydraulic control valve and ultimately the position of the plunger. This eliminates the time variable in the equation, allowing for a more accurate and efficient glass making process.

While the use of a hydraulically-actuated plunger addresses the time dependency problem inherent in previous technology, any system dependent upon the position of the plunger is critically dependent upon the accuracy of the position detection components of the device, which may not always be the most precise. The Leweringhaus invention still relies upon traditional position detection and indication of the plunger, i.e., a coil-and-core type sensor. One such coil-and-core type sensor is disclosed in U.S. Pat. No. 4,613,352 issued to Mannfred Krumme.

In the Krumme patent, a ring-shaped core is carried by a piston rod mounted to the plunger of the glass-forming machine. The core forms an actuating element for changing the inductivity of a coil which is arranged in a ring-shaped frame between a cylinder and a guiding cylinder for the plunger. During each working stroke of the plunger, the maximum insertion depth in the mold is measured and used to generate an analog electrical signal. The signal is then compared to a reference value which, in turn, provides an adjusting value for adjusting the mass of the gob prior to delivery. One disadvantage, however, of the core-and-coil type sensor is that the linear position of the plunger cannot be measured for the full stroke of the plunger.

The disclosures of the aforesaid U.S. Pat. Nos. 5,236,485 and 4,613,352 are incorporated by reference herein.

SUMMARY

The present invention avoids any inherent problems related to the use of hydraulics and/or air pressure to control the movement of the plunger while at the same time increases the accuracy of plunger displacement measurement. The device disclosed herein provides more control over plunger movement, while increasing its versatility as to the types of operations available.

One feature of the present invention relates to the movement of the plunger. In lieu of a hydraulically controlled system, plunger movement in the preferred embodiment is made possible by a servo-driven leadscrew which is positioned inside the existing plunger cylinder. By using a motor wrapped around an "inside-out" leadscrew, the unit can be made sufficiently small enough to fit into the space allotted for the standard plunger cylinder. This type of servo-driven leadscrew, also known as a linear actuator, is disclosed in U.S. patent application Ser. No. 08/125,495, now U.S. Pat.

No. 5,491,392, currently assigned to Exlar Corporation of Chanhassen, Minn., and is hereby incorporated by reference.

Another feature of the present invention is the use of a position sensor to determine the position of the plunger and then use the position information for feedback to the system controller. By using the position information as feedback, the position of the plunger may be adjusted according to system dynamics. Such use of position information greatly increases the accuracy over a conventional system which controls the position of the plunger using the time factor alone and makes no adjustments during the work cycle. A resolver is used to provide both commutation information about the motor as well as precise plunger position information. The effective resolution of this device when coupled to a leadscrew is at least an order of magnitude better than the core-and-coil sensors currently used in the industry. Furthermore, whereas most coil-and-core sensors are good for only a limited range of the plunger stroke, the resolver provides information over the full range of cylinder movement. The glass plunger of the present invention utilizes the above-mentioned features to operate in a variety of modes during different parts of its operation cycle.

When there is no glass in the mold chamber, the enhanced plunger position control is used to stop the plunger's forward movement just short of the mechanical travel limit of the cylinder. When the plunger reaches a predetermined safety setpoint (as indicated by the position information), the system controller issues a stop signal to the plunger. This prevents damage which could be done by allowing the cylinder to drive itself forward into the wall of the mold chamber.

During normal operation (when glass is present in the mold chamber), the plunger will stop short of the position setpoint because the plunger makes contact with the molten glass gob first. As the plunger begins to penetrate the gob, the plunger movement will then be restricted by the volume of the molten glass in the mold chamber. The depth of the penetration of the plunger into the glass will depend upon the amount of glass in the mold chamber (specifically, the depth is inversely proportional to the amount of glass). Pressing pressure is dictated by the motor torque and screw mechanics (since the force exerted by the leadscrew onto the plunger is a product of the torque generated by the motor, it is possible to control the pressure by controlling the torque applied by the motor to the leadscrew). While the gob weight cannot be measured directly, changes in the gob weight can be measured by close monitoring of the depth of the plunger penetration. This information can then be used as a feedback signal to control gob weight. The ability to precisely control the pressing pressure translates into more accurate measurements from cycle to cycle, since the variation in pressing pressure has been minimized.

The pressing pressure is maintained for a calculated period of time. When commanded, the plunger moves downward to a position where the plunger is clear of the mold cavity and neckring mold. After the parison has been transferred, the plunger moves to the "load" position. Both of the plunger movements are governed exclusively by position control. Torque control is applied only when the plunger is moving upward in contact with the glass.

The "plunger down" position and the "load" position can be controlled electronically. For a job change, the operator need only input new plunger positions into the system, even during operation. Since the load position need not be determined by the cartridge, construction of the plunger cartridge can be simplified. In fact, for the "press and blow" and "narrow neck press and blow" processes, the cartridge becomes just a sleeve to control plunger alignment. However, for "blow and blow," the cartridge must still incorporate a pneumatic feature to blow the parison into the shape of the mold cavity.

Accordingly, it is an object of the present invention to provide a glass-forming machine plunger which is precisely controlled by a leadscrew and accompanying motor.

It is yet another object of the present invention to provide a more accurate position-sensing device, i.e., accurate enough to provide information over the full range of plunger stroke and to allow for gob weight control.

For a further understanding of the present invention and the objects thereof, attention is directed to the drawings and the following brief description thereof, to the detailed description of the preferred embodiment, and to the appended claims.

DETAILED DESCRIPTION

Figure 1:
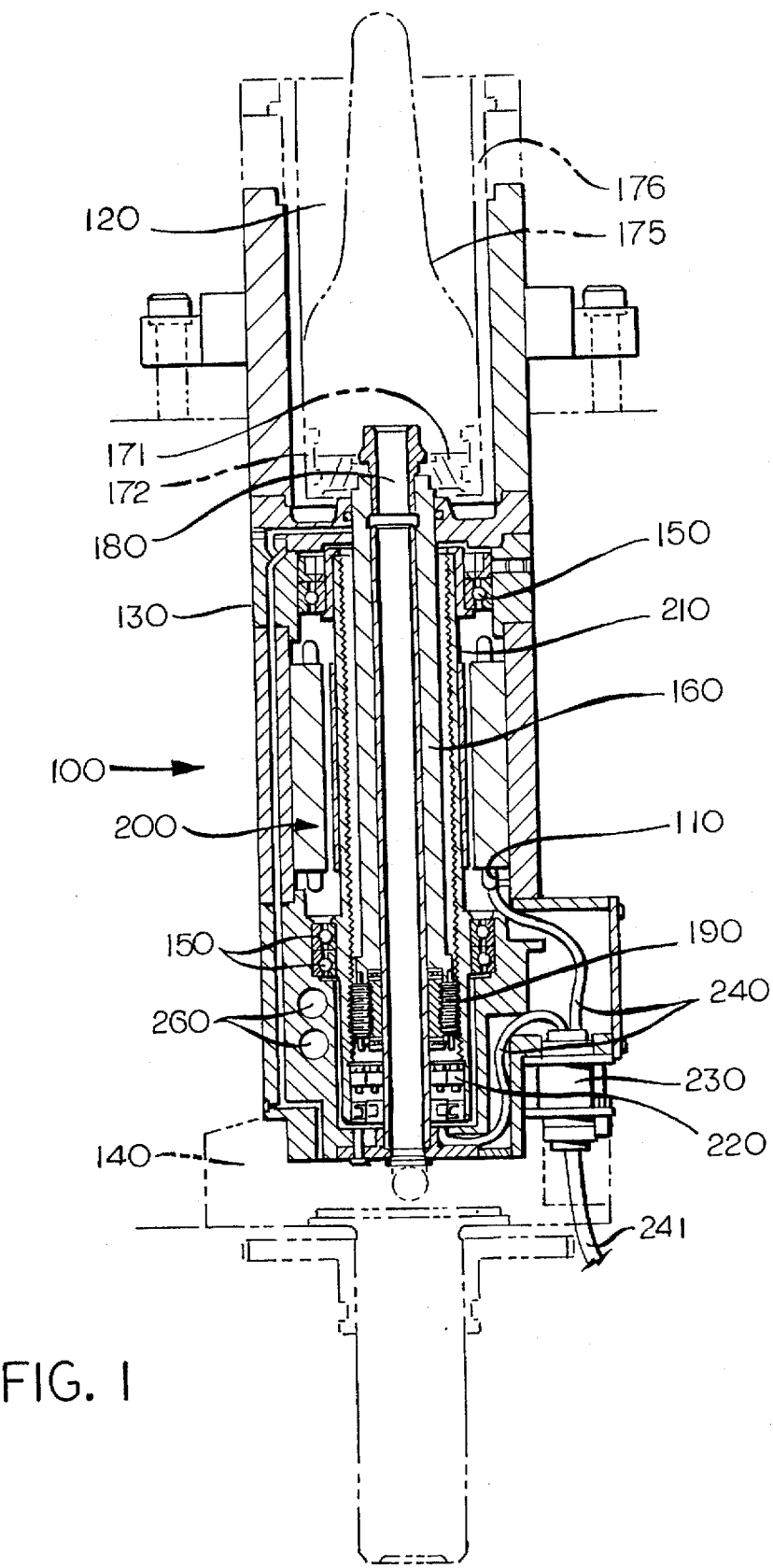
FIG. 1 is a cross-sectional view of a plunger mechanism according to the preferred embodiment of the present invention.
Figure 2:
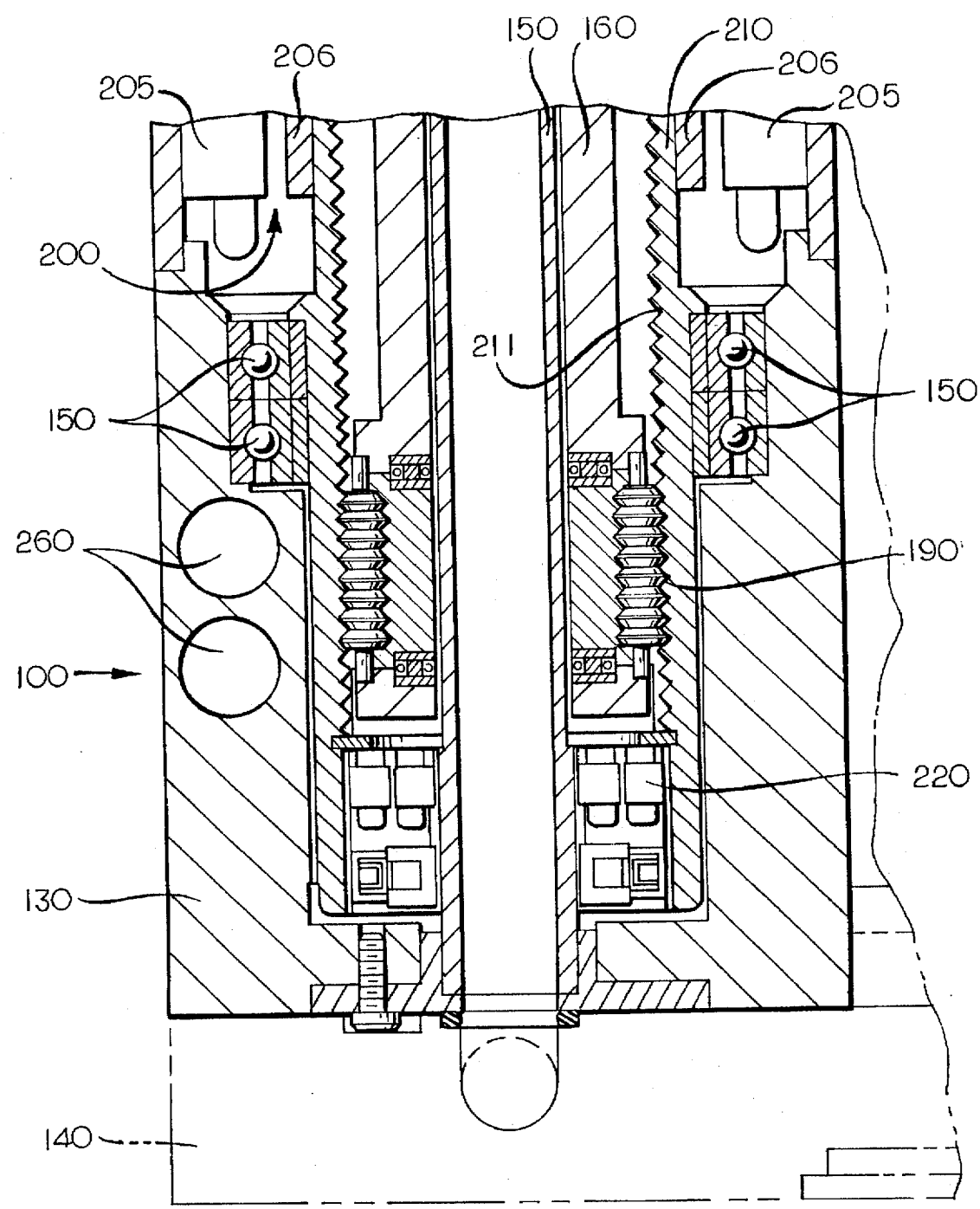
FIG. 2 is an expanded cross-sectional view of the lower portion of the plunger mechanism of FIG. 1.
Figure 3:
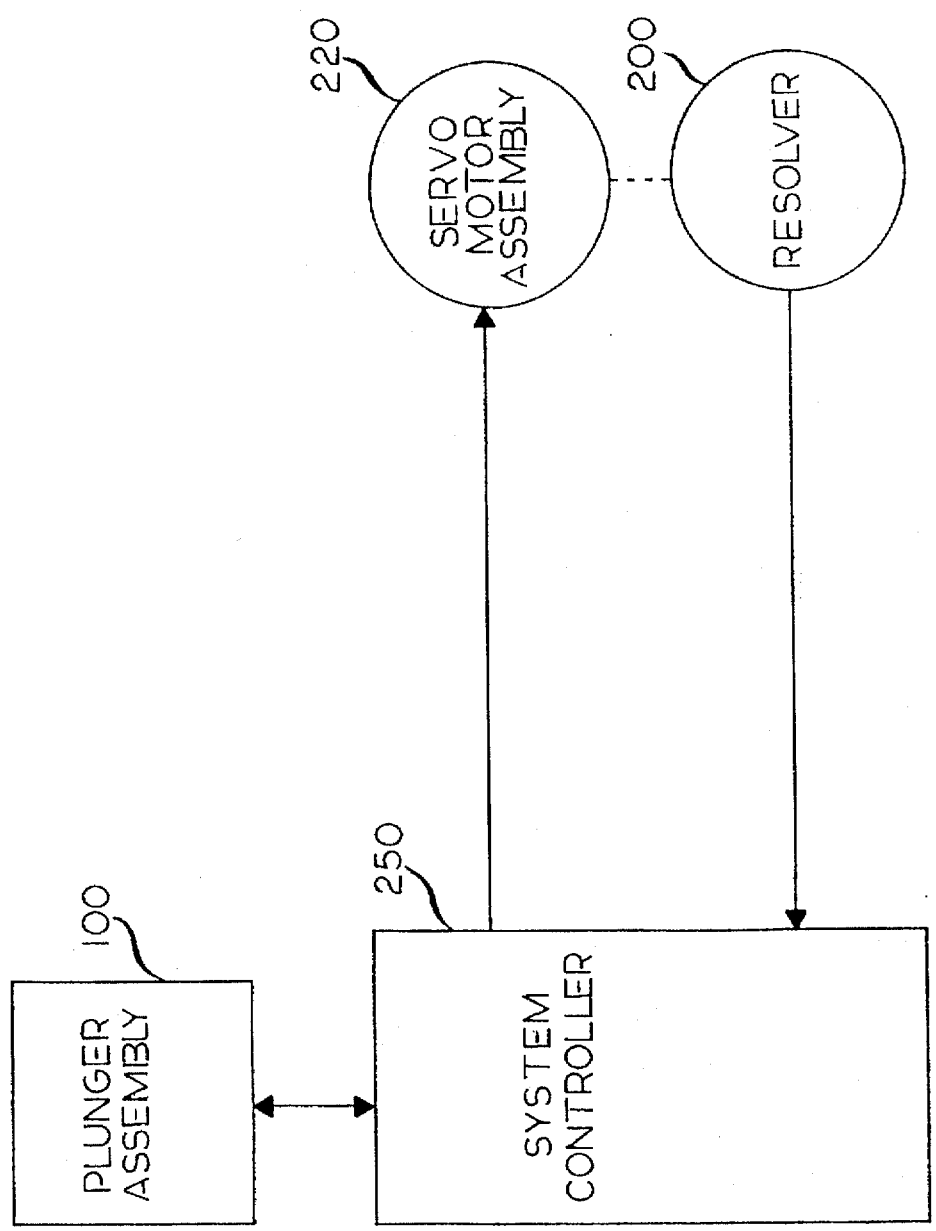
FIG. 3 is a schematic view illustrating a control system for controlling the operation of the plunger mechanism of FIGS. 1 and 2.

Plunger assembly 100, shown in FIG. 1, includes main cavity 110 which is formed by cylindrical outer wall 130 and base 140. Cartridge 176 houses plunger head 171 and plunger 175 in a cavity 120 of the cartridge 176. The mold cavity (not shown), into which the molten gob is delivered, is of standard construction and is fixed to the upper portion of cartridge 176. Plunger head 171 is attached to plunger 175 via locking ring 172, which may be formed of two separate pieces. Plunger head 171 is further attached to rod 160 utilizing retaining nut 180. The rod 160 is of annular construction and surrounds an elongate annular alignment guide 152. Plunger assembly 100 includes internal cylinder 210 which is formed of a magnetic material and which is rotatably supported with respect to outer wall 130. Bearings 150 allow for smooth rotation of internal cylinder 210 within outer wall 130 during operation. Plunger rollers 190 are attached to rod 160, best shown in FIG. 2. Servo motor 200 includes motor stator 205 and magnets 206 which are mounted to the outer surface of internal cylinder 210 to form an armature with internal cylinder 210. Motor stator 205 is attached to and supported by outer wall 130 and surrounds internal cylinder 210. System controller 250, made of conventional construction, selectively actuates motor stator 205 to rotate the armature in one direction or the other, depending upon the function required.

Internal cylinder 210 contains threaded bore 211, the threads of which are engaged by plunger rollers 190. Rod 160 is coupled with plunger rollers 190 such that rod 160 moves axially within internal cylinder 210 upon rotation of internal cylinder 210. Plunger assembly 100 described herein, which converts rotary input to linear motion using an involute-helicoidical screw, commonly referred to as an "inside-out leadscrew," is similar to those disclosed in U.S. Pat. Nos. 4,048,867 and 4,576,057, both of which are incorporated by reference herein.

Servo motor 200 and position-sensing resolver 220 are electrically connected to system controller 250 via internal wiring 240, connector 230, and external wiring 241.

There are three primary positions of plunger 175 during normal operation of plunger assembly 100. The first position is referred to as the "load" position, shown in FIG. 1. The load position is located between the most forward position of plunger 175 (where plunger 175 would actually make contact with the forward wall of mold cavity, not shown, if no gob was present) and the most rearward position. The second position is the "press" position; it is the position of plunger 175 as it comes into physical contact with the molten gob. It is proximate to the most forward position of plunger 175 (depending upon the amount of molten glass in the mold cavity). The final position is the "plunger down" position, which is the most rearward position of plunger 175. The operation of plunger assembly 100 and its use of the three primary positions are as follows.

The portion of the NNPB process relevant to the present invention begins with plunger 175 in the "load" position as shown in FIG. 1. A gob of molten glass (not shown) is delivered to parison forming mold cavity (not shown) and the mold cavity cover (not shown) is closed. A signal is sent from system controller 250 through external wiring 241, connector 230, and internal wiring 240, thus actuating servo motor assembly 200 and causing internal cylinder 210 to rotate. Threaded bore 211 of internal cylinder 210 engages plunger rollers 190 which are attached to rod 160, thus moving plunger 175 forward toward the molten gob of glass (not shown) held captive in the mold cavity (not shown). Resolver 220 continuously relays information regarding the axial position of plunger 175 to system controller 250. As plunger 175 moves forward it eventually makes contact with the molten glass in mold cavity (not shown). This is the second position, known as the "press" position.

As the plunger 175 begins to penetrate the gob (not shown), position control of plunger 175 is discontinued and torque control is utilized. The shift from position control to torque control is necessary to avoid potential problems due to the amount of molten glass in the mold cavity (not shown), which could vary in volume. Less molten glass in the mold cavity could result in unfilled finishes; more glass in the mold cavity could result in the mold cavity being forced open by too much pressure.

The depth of plunger 175 penetration into the glass during the pressing phase of the process depends upon the pressing pressure and the amount of glass in the mold cavity. The pressing pressure is a quantity derived from the motor torque and screw mechanics. The equation for calculating pressure is:

$$W = \frac{2\pi T_m}{p\epsilon}$$

where W is pressing pressure, $T_m$ is motor torque, p is the lead of the screw, and $\epsilon$ is the efficiency of the screw. Alternatively, the pressing pressure can be measured directly by connecting a strain gauge 260 to rod 160.

With increased axial position monitoring, gob weight control can be achieved. While gob weight cannot be measured directly, changes in gob weight can be measured by closely monitoring the position of plunger 175. Because the volume of mold cavity (not shown) is a fixed and known quantity, the position of plunger 175 is indicative of the amount of glass present, and accordingly, the weight of the glass present. If the penetration of plunger 175 is further forward, there is less molten glass present in the mold cavity; if the penetration is less, there is, logically, more glass present.

Plunger 175 (attached to rod 160) continues to press into the molten glass. When the desired torque for sufficiently forming the parison is achieved, plunger 175 is held in position for a short period of time, typically measured in milliseconds. The system controller 250 then initiates another signal instructing motor assembly 200 to actuate in a reverse direction, causing internal cylinder 210 to rotate in the opposite direction, moving plunger 175 away from the formed parison until it comes to rest at the third, or "plunger down" position, which is the position farthest away from mold cavity (not shown). This third plunger position allows the parison to be removed from the mold cavity to its next station without obstruction by the plunger head. Once the parison is moved to its next station, it is blown into the desired hollow glass article. Once the parison is removed from the mold cavity, plunger 175 is reset to the "load" (intermediate) position. The next gob of molten glass is then delivered to the mold cavity and the process repeats.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and equivalents thereof.

What is claimed is:

1. An apparatus for forming a gob of molten glass into a hollow article, comprising:

plunger means having a plunger for contacting a gob of molten glass to shape it into a hollow article;

an electro servo-driven leadscrew connected to said plunger means for translating said plunger means along a rectilinear stroke toward and away from the glass gob to bring said plunger means into and out of contact with said glass gob; and control means for controlling the operation of said electro servo-driven leadscrew to control the rectilinear stroke toward and away from the glass gob, said control means comprising a plunger means position sensing resolver for sensing the position of said plunger means at all locations along said stroke.

2. The apparatus of claim 1 wherein said control means comprises means for determining the amount of pressing pressure applied by said plunger to said gob of molten glass.

3. The apparatus of claim 1 further comprising a rod, said rod functionally connecting said plunger to said electro servo-driven leadscrew.

4. The apparatus of claim 3 further comprising a strain gauge, said strain gauge being connected to said rod, said strain gauge for measuring the amount of pressing pressure applied by said plunger to said gob of molten glass.

5. An apparatus for forming a gob of molten glass into a hollow article, in a parison forming mold, said apparatus comprising:

a hollow cartridge;

a housing, said housing being attached to said cartridge;

a motor, said motor mounted within said housing, an inside out leadscrew, said inside out leadscrew having threads, said inside out leadscrew being located within said motor, said inside out leadscrew being rotatable with respect to said motor and said housing;

a plurality of rollers, said plurality of rollers engaged with said threads of said inside out leadscrew;

a rod, said rod having a forward end and a rearward end, said rod being partially contained within said housing, said forward end of said rod extending into said cartridge, said rod being attached to said plurality of rollers between said forward end of said rod and said rearward end of said rod, whereby allowing the rotation of said inside out leadscrew to be translated into linear movement of said rod;

a plunger, said plunger connected to said forward end of said rod, said plunger being located within said cartridge; and, means for monitoring and controlling the linear movement of said rod whereby allowing said plunger to come into and out of contact with said gob of molten glass contained in said parison forming mold.

6. The apparatus according to claim 5 wherein said monitoring and controlling means comprises:

a plunger position sensing resolver, said plunger position sensing resolver located within said housing and electrically connected to said motor;

a system controller, said system controller electrically connected to said resolver and said motor, said system controller for processing signals from said resolver and further for issuing actuation signals to said motor.

7. The apparatus according to claim 6 wherein said means for monitoring and controlling further comprises a means for determining pressing pressure exerted by said plunger on the gob.

* * * * *